United States Patent Office 3,393,993
Patented July 23, 1968

3,393,993
HERBICIDALLY ACTIVE CYCLOALKENYL DIHYDRIC FLUOROALCOHOLS AND METHOD OF CONTROLLING WEEDS THEREWITH
Everett E. Gilbert, Morristown, and James O. Peterson, Rockaway, N.J., assignors to Allied Chemical Corporation, New York, N.Y., a corporation of New York
No Drawing. Filed Dec. 27, 1965, Ser. No. 516,697
12 Claims. (Cl. 71—122)

ABSTRACT OF THE DISCLOSURE

Herbicidally active cycloalkenyl dihydric fluoroalcohols having 5 to 8 ring carbons of the structures

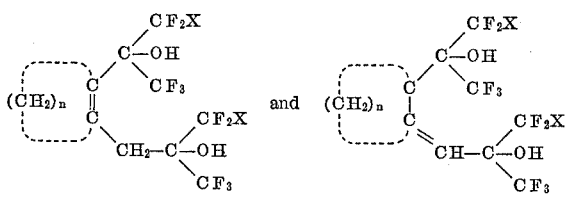

wherein X is chlorine or fluorine and $n$ is an integer from 3 to 6 inclusive and process for controlling weeds therewith.

---

This invention relates to new cycloalkenyl dihydric fluoroalcohols and to a method of controlling unwanted vegetation therewith.

The new dihydric fluoroalcohols of our invention are adducts of one mole of a methyl cycloalkene of 5 to 8 ring carbons with two moles of a fluorine-substituted, perhalogenated acetone.

The new dihydric fluoroalcohols of our invention have the Formula A shown below

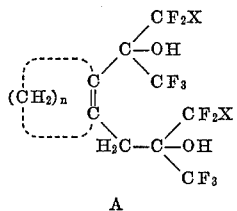

A wherein X is fluorine or chlorine, and $n$ is an integer from 3 to 6 inclusive, in some cases appearing partly in the isomeric form B shown below

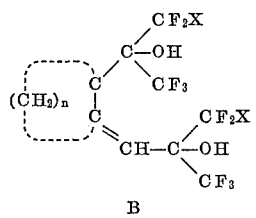

B wherein X and $n$ are as defined above.

The new compounds of our invention can be prepared by mixing under substantially anhydrous conditions a fluorine-substituted, perhalogenated acetone with a cycloalkenyl compound having 5 to 8 carbon atoms in the cycloalkenyl group and having a methyl substituent on one of the doubly bound carbon atoms, in the mole ratio of at least 2 moles of perhaloacetone per mole of cycloalkene, according to the equation set forth below

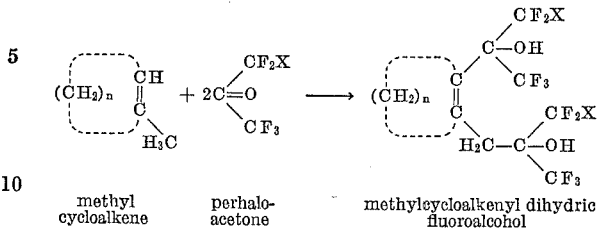

methyl cycloalkene    perhaloacetone    methylcycloalkenyl dihydric fluoroalcohol wherein X and $n$ are as defined above.

Of the compounds prepared according to our invention, most appear to have at least predominantly the A structure shown for the reaction product in the above equation. That prepared from α-methyl cyclooctene, however, appears to consist of each of two structural isomers, one having the double bond in the ring skeleton, the other having the double bond outside the ring as shown below.

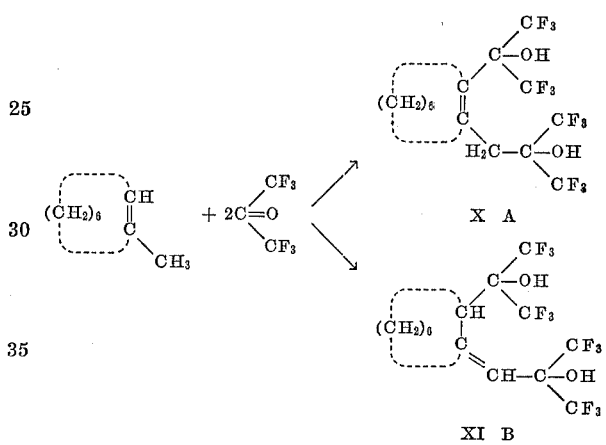

X A

XI B

Specific illustrative compounds are shown below.

(I) 1-[(hexafluoro-2-hydroxy-2-propyl)-methyl]-2-(hexafluoro-2'-hydroxy-2'-propyl)-cyclopentene

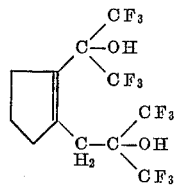

(II) 1-[(hexafluoro-2-hydroxy-2-propyl)-methyl]-2-hexafluoro-2'-hydroxy-2'-propyl)-cyclohexene

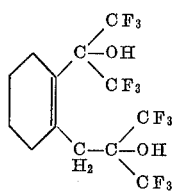

(III) 1-[(hexafluoro-2-hydroxy-2-propyl)-methyl]-2-(hexafluoro-2'-hydroxy-2'-propyl)-cycloheptene

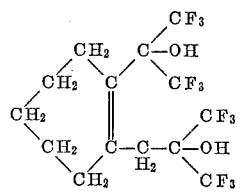

(IV) 1-[(hexafluoro-2-hydroxy-2 - propyl) - methyl] - 2-(hexafluoro-2'-hydroxy-2'-propyl)-cycloheptene

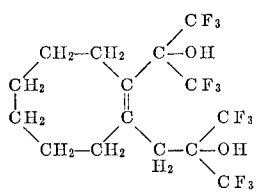

(V) 1-[(hexafluoro-2-hydroxy-2-propyl) - methenyl] - 2-(hexafluoro-2'-hydroxy-2'-propyl)-cycloheptene

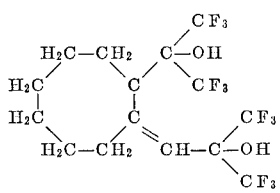

(VI) 1-[(pentafluoromonochloro-2-hydroxy - 2 - propyl)-methyl]-2-(pentafluoromonochloro - 2' - hydroxy - 2'-propyl)cyclohexene

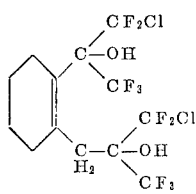

The dihydric fluoroalcohols of our invention are herbicidally active and are thus useful in controlling unwanted vegetation, especially broadleaf weeds, and exhibit considerable selectivity with respect to such weeds, being substantially non-injurious to the standard crop seeds, corn, cotton, wheat and to some extent, soybeans, when applied to the soil as pre-emergence herbicides. The methyl cyclohexenylhexafluoroacetone adduct (Cpd. II), is also especially useful in post-emergence use against broadleaf weeds such as rape in connection with cotton and wheat crops, having little, if any, injurious effect on these crop plants. The herbicidal activity of these alcohols is surprising inasmuch as the corresponding monohydric alcohols, i.e. the adducts of one mole of the methyl cycloalkenes with a single mole of fluoroacetone exhibit no herbicidal activity.

Application of the compounds of our invention as herbicides can be made in conventional manner, using the compounds alone or in admixture with each other and/or with a diluent or carrier. Usually the active compounds are mixed with at least one diluent, either solid or liquid, and are applied to the locus to be protected, for example to the plant or to the ground or area containing seeds or to be seeded.

The toxicant is thus applied in lethal concentration, for example, by means of finely divided dusts, coarse granules or pellets, solvent solutions, or aqueous sprays. The dihydric alcohols of our invention, which are relatively insoluble in water, can be prepared in the form of aqueous dispersions as by dissolving the alcohol in a solvent such as acetone, and dispersing the solution in water with the aid of anionic, cationic, or non-ionic wetting, dispersing and emulsifying agents. Concentrations of toxicant will depend on the sensitivity of the organisms to be controlled. Usually concentrations between about .03% and about 3.0% are sufficient.

Dusts, granules, pellets and wettable powders can also be used in applying the dihydric fluoroalcohol compounds according to our invention. For the preparation of dusts the alcohol or the appropriate salt thereof may be mixed in finely divided solid form with suitable powders including finely divided dry solid talc, clays such as attapulgite, koalin, or fuller's earth, wood flour, or other inert solid carriers of the type commonly employed in formulating pesticidal powder compositions. These powders may be granulated or pelleted; or solutions or the dihydric fluoroalcohol carbonates may be impregnated into granular or pelleted carriers of mineral and vegetable origin. Wettable powder formulations, suitable for dispersing in water and applying the water dispersion to the soil or plants, are prepared by incorporating in any of the finely divided powders, small amounts of surface active materials, for example, about 1% to about 5% by weight, which serves to maintain the finely powered composition dispersed in water with which it is mixed.

Suitable surface active materials adapted for use in making both liquid and solid dispersions are anionic, cationic, or non-ionic wetting, dispersing and emulsifying agents commonly employed in the formulation of wettable powder compositions, for example, as listed by J. W. McCutcheon in "Soap and Chemical Specialties," December 1957 and January, February, March and April 1958. These include the alkali metal and ammonium salts of long chain aliphatic carboxylic acids, sulfonates of the aromatic or long chain aliphatic hydrocarbons, such as sodium alkyl sulfates and sulfonates, alkyl aryl sulfonate salts, sulfonates of glycerides and their fatty acids and sulfonates of derivatives of fatty acid esters.

The following specific examples further illustrate our invention.

Example 1.—Preparation of 1-[(hexafluoro-2-hydroxy - 2-propyl)-methyl]-2-(hexafluoro-2'-hydroxy-2' - propyl)-cyclopentene 1-methyl cyclopentene in the amount of 12.3 grams (0.15 mole) was mixed with 49.8 grams (0.3 mole) of hexafluoroacetone and heated in a bomb at 175° C. for 55 hours. The bomb was then cooled to room temperature, vented and opened. The resulting crude semi-solid product was crystallized from petroleum ether and yielded 46 grams (76% yield) of a compound melting at 124°–125° C. This compound was shown by infrared and nuclear magnetic resonance analysis to contain two hydroxyl groups, trifluoromethyl groups, a CH₂ group bonded to a hexafluorohydroxypropyl group, and no hydrogens attached to a double bond and was thus identified as 1-[(hexafluoro-2-hydroxy-2-propyl) - methyl] - 2 - (hexafluoro-2'-hydroxy-2'-propyl)-cyclopentene.

Example 2.—Preparation of 1-[(hexafluoro-2-hydroxy-2-propyl)-methyl] - 2 - (hexafluoro-2'-hydroxy-2'-propyl)-cyclohexene 1-methyl cyclohexene (19.3 grams, 0.2 mole) and 66.4 grams (0.4 mole) of hexafluoroacetone were mixed and heated for 10 hours at 160° C. to 175° C. in a bomb. The bomb was then cooled to room temperatures (Ca. 25° C.) vented and opened. The reaction product was a mixture of white solid and a liquid. The solid was recrystallized from petroleum ether and yielded 29 grams of solid product equivalent to a yield of 34% of theoretical. Analysis showed 54.6% fluorine found, 53.4 calculated. The solid product was identified as the 2:1 adduct, namely 1 - [(hexafluoro-2-hydroxy-2-propyl)-methyl]-2-(hexafluoro-2'-hydroxy-2'-propyl)-cyclohexene by conversion to the known diacid by hydrolysis and by instrumental analysis, i.e. by infrared and nuclear magnetic resonance. This 2:1 adduct was found to be herbicidally active.

In addition to the 2:1 adduct there were isolated 25 grams (48% yield) of the 1:1 adduct from the liquid portion of the reaction mass, namely 1-(hexafluoro-2-hydroxy-2-propylmethyl)-cyclohexene, B.P. 133°–137° C. This 1:1 compound, unlike the 2:1 compound, was found to be inactive as a herbicide. Reaction of this compound with hexafluoroacetone results in production of the 2:1 adduct described above.

Example 3.—Preparation of 1-[(hexafluoro-2-hydroxy-2 - propyl) - methyl] - 2 - (hexafluoro - 2' - hydroxy-2'-propyl)-1-cycloheptene 1-methyl cycloheptene in the amount of 11.0 grams (0.1 mole) and 41.5 grams (0.25 mole) of hexafluoroacetone were mixed and heated together in a bomb at 175°–180° C. for 80 hours. The bomb was then cooled, vented and opened. The semi-solid product was crystallized from petroleum ether yielding 25 grams (57% yield) of a compound melting at 113°–115° C. Infrared spectral analysis and nuclear magnetic resonance analysis identified the compound as the 2:1 adduct, namely 1-[(hexafluoro-2-hydroxy-2-propyl)-methyl] - 2 - (hexafluoro-2'-hydroxy-2'-propyl)-cycloheptene. The petroleum ether filterate, upon evaporation yielded 10 grams (36% yield) of the corresponding 1:1 adduct.

Example 4.—Preparation of 1-[(hexafluoro-2-hydroxy-2-propyl)-methyl]-2-(hexafluoro - 2' - hydroxy-2'-propyl)-cyclooctene 1-methyl cyclooctene in the amount of 12.4 grams (0.1 mole) and 41.5 grams (0.25 mole) of hexafluoroacetone were mixed and heated in a bomb at 175°–180° C. for 90 hours. The bomb was then cooled, vented and opened. The resulting reaction mixture was vacuum distilled yielding two fractions. The first fraction, (amounting to 18.5 grams, a 64% yield) having a boiling point of 115°–125° C. at 40 mm., was identified, by infrared and nuclear magnetic resonance analysis as the 1:1 adduct. The second fraction, (amounting to 11 grams, a 24% yield) was recrysttallized from petroleum ether and yielded two products A, with a melting point of 144°–146° C. and (as a second crop) B, with a melting point of 98°–100° C. Nuclear magnetic resonance analysis indicated the structures given below for the two compounds.

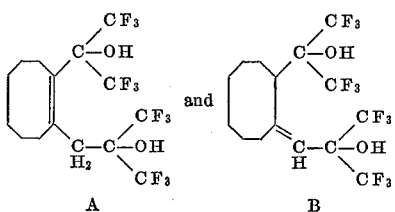

The two above isomers were present in the proportions of approximately 30% of isomer A and 70% isomer B by weight.

Example 5.—Preparation of 1-[(pentafluoromonochloro-2-hydroxy-2-propyl)-methyl] - 2 - (pentafluoromonochloro-2'-hydroxy-2'-propyl)-cyclohexene 1-methyl cyclohexene (13.5 grams, 0.14 mole) and pentafluoromonochloroacetone (54.6 grams, 0.3 mole) were mixed and heated for 50 hours at 170° to 180° C. in a bomb. The bomb was then cooled to room temperature (Ca. 25° C.), vented and opened. The liquid reaction product was distilled in vacuo, yielding 23 grams of product boiling at 123–5° C. at 50 mm. mercury pressure. Analysis of this material showed 3.6% hydrogen and 32.7% fluorine found; calculated for the 1:1 compound is 4.3 and 34.0%, respectively indicating that this material was the 1:1 adduct. A second fraction was taken boiling at 129–33° C. at 5 mm.; recrystallization from petroleum ether gave an M.P. 87–89° C. Analysis of this material showed 41.3% fluorine found; the calculated percentage is 41.2% for the 2:1 compound indicating that this material was the 2:1 adduct. The yields of the two materials are 62 and 23%, respectively, based on hydrocarbon. The 2:1 compound was shown by NMR analysis to have the double bond situated in the ring, i.e. to have the formula

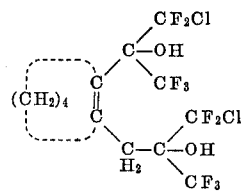

Example 6

The dihydroxy compounds of Examples 1–5 (mixed isomers in the case of Example 4) were tested as pre-emergence and post-emergence herbicides in standard macro screening greenhouse tests.

In the pre-emergence tests, the toxicant, dispersed in a liquid such as acetone or water, was sprayed, within one day after seeding, onto seeded flats containing test crop seed species and test weed seed species, at a volume of spray equal to 80 gallons of spray per acre and at concentrations of toxicant per acre of 16, 8 or 4 pounds per acre. Immediately after spraying, the test flats were sub-irrigated and the needed moisture maintained during the following 16-day test period during which the flats were held in the greenhouse for observation, and were then rated as described hereinafter. In the post-emergence tests, flats with crop and weed seedlings were treated 8 to 10 days after seeding with the indicated toxicant at a rate equivalent to 16 pounds per acre, and held for a 10 to 12 day observation period, after which they were rated.

In both the pre-emergence and post-emergence tests, similarly seeded but untreated flats were held for comparison. The response of the test plant to the toxicant was measured by "injury rating" (IR) on a scale of 0 to 10; 0 indicating no injury, 10 indicating complete kill of the test plants. "Percent mortality" (PK), a calculated index, is obtained by comparing the mortality in the toxicant treated flats with that in the untreated flats. Results of pre-emergence tests are shown in Table I; results of post-emergence tests are shown in Table II below.

TABLE I.—PRE-EMERGENCE TESTS

| Crop or Weed | Compound of Example No. | | | | |
|---|---|---|---|---|---|
| | 1 | 2 | 3 | 4 | 5 |
| Corn: | | | | | |
| IR | 1 | 0 | 0 | 0 | 0 |
| PK | 0 | 0 | 0 | 0 | 0 |
| Cotton: | | | | | |
| IR | 1 | 3 | 1 | 0 | 2 |
| PK | 0 | 33 | 0 | 0 | 20 |
| Wheat: | | | | | |
| IR | 0 | 1 | 1 | 1 | 0 |
| PK | 0 | 0 | 0 | 11 | 0 |
| Soybeans: | | | | | |
| IR | 1 | 0 | 1 | 2 | 0 |
| PK | 8 | 0 | 8 | 15 | 0 |
| Rape: | | | | | |
| IR | 10 | 10 | 10 | 10 | 8 |
| PK | 100 | 100 | 100 | 100 | 80 |

TABLE II.—POST-EMERGENCE TESTS—INJURY RATING

| Crop or Weed | Compound of Example No. | | | | |
|---|---|---|---|---|---|
| | 1 | 2 | 3 | 4 | 5 |
| Corn | 2 | 0 | 1 | 0 | 0 |
| Cotton | 2 | 10 | 6 | 3 | 10 |
| Wheat | 6 | 0 | 3 | 5 | 2 |
| Soybeans | 2 | 10 | 4 | 3 | 9 |
| Rye Grass | 9.5 | 0 | 5 | 5 | 3 |
| Rape | 10 | 10 | 10 | 9 | 10 |

It will be noted from the tables that the compounds of our invention are excellent selective herbicides for broadleaf weeds such as rape and show little or no injury to crops such as corn and wheat.

While the above describes the preferred embodiments of our invention, it will be understood that departures can be made therefrom within the scope of the specification and claims.

We claim:
1. Cycloalkenyl dihydric fluoroalcohols of the formulas

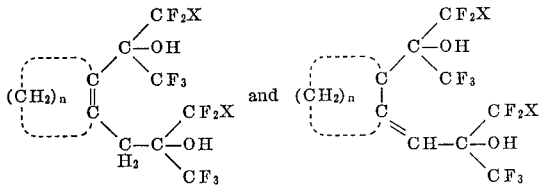

wherein X is fluorine or chlorine and $n$ is an integer from 3 to 6 inclusive.

2. Cycloalkenyl dihydric fluoroalcohols of the formula

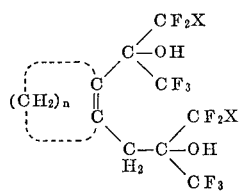

wherein X is fluorine or chlorine and $n$ is an integer from 3 to 6 inclusive.

3. The compound of claim 2 wherein X is fluorine and $n$ is 3.
4. The compound of claim 2 wherein X is fluorine and $n$ is 4.
5. The compound of claim 2 wherein X is fluorine and $n$ is 5.
6. A mixture consisting essentially of adducts of one mole of methyl cyclooctene and two moles of hexafluoroacetone of the structures

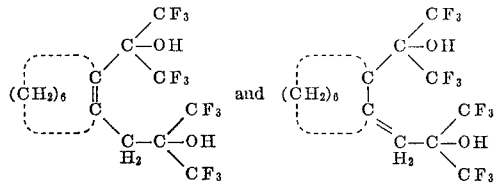

7. The process for controlling weeds which comprises applying to a locus to be protected, a lethal concentration of a compound of the formula

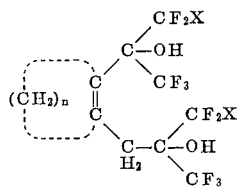

wherein X is fluorine or chlorine and $n$ is an integer from 3 to 6 inclusive.

8. The process according to claim 7 wherein X is fluorine.
9. The process according to claim 7 wherein X is fluorine and $n$ is 3.
10. The process according to claim 7 wherein X is fluorine and $n$ is 4.
11. The process according to claim 7 wherein X is fluorine and $n$ is 5.
12. A composition of matter comprising an herbicidally lethal proportion of a compound of the formula

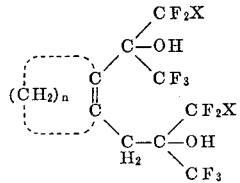

wherein X is chlorine or fluorine and $n$ is an integer from 3 to 6 inclusive, dispersed in a herbicidal adjuvant as carrier.

References Cited

UNITED STATES PATENTS

| | | | |
|---|---|---|---|
| 3,320,047 | 5/1967 | Gilbert | 71—122 |
| 3,324,187 | 6/1966 | Litt et al. | 260—633 |
| 3,284,516 | 11/1966 | Davis | 260—633 |
| 3,356,485 | 12/1967 | Farah et al. | 71—122 |

OTHER REFERENCES

Knunyants et al.: cited in Chem. Abst. 57, 10999–11000 (1962).

Knunyants et al.: cited in Chem. Abst. 57, 12305–12306 (1962).

LEWIS GOTTS, *Primary Examiner.*

M. M. KASSENOFF, *Assistant Examiner.*